July 16, 1940.　　　　　N. C. PRICE　　　　　2,208,554
PRESSURE CONTROL SYSTEM FOR AIRCRAFT CABINS
Filed July 19, 1937　　　3 Sheets—Sheet 3
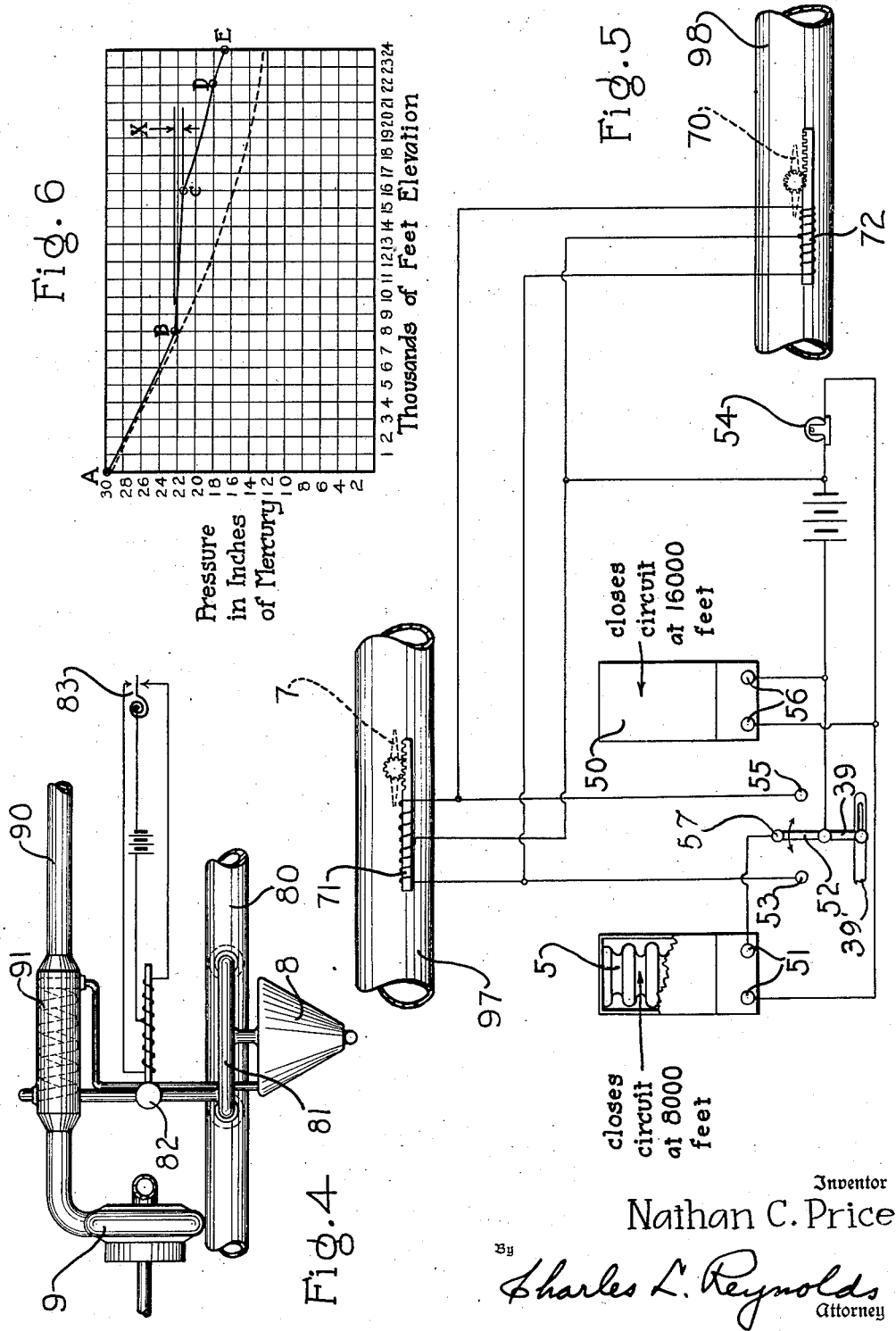
Inventor
Nathan C. Price
By Charles L. Reynolds
Attorney Patented July 16, 1940

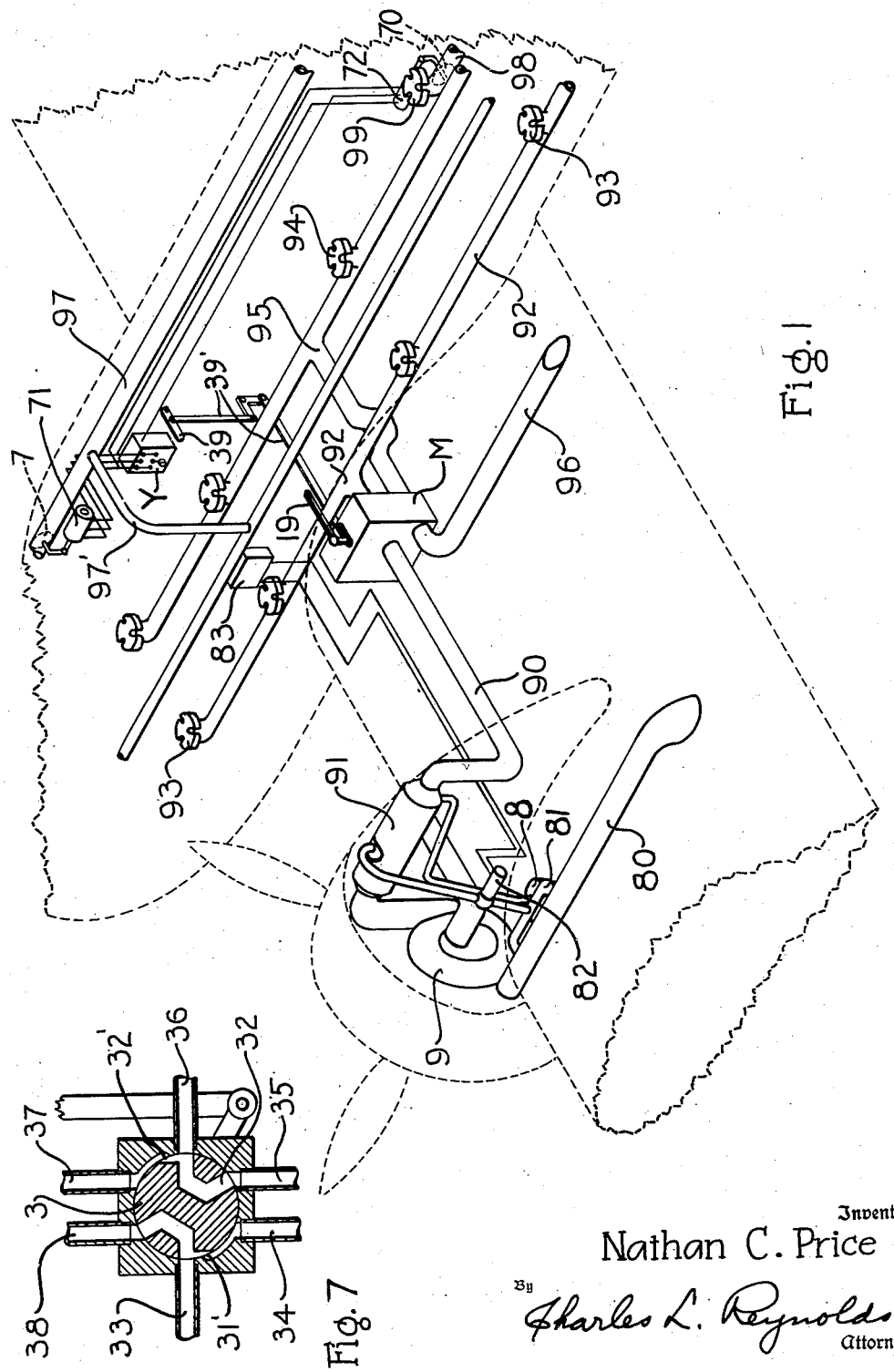

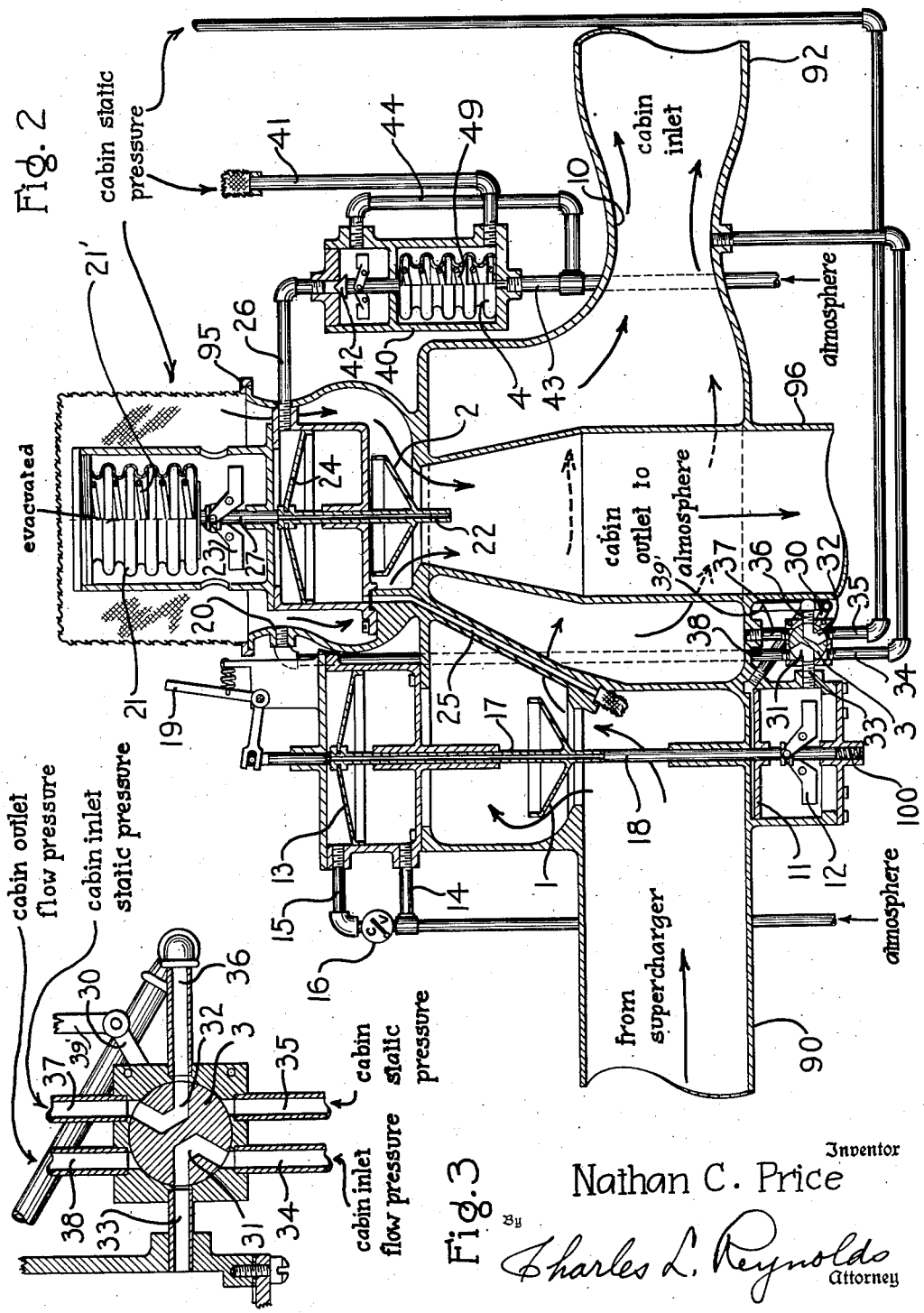

2,208,554

UNITED STATES PATENT OFFICE 2,208,554

PRESSURE CONTROL SYSTEM FOR AIRCRAFT CABINS

Nathan C. Price, Seattle, Wash., assignor, by mesne assignments, to The Pacific National Bank of Seattle, Seattle, Wash., a national banking association Application July 19, 1937, Serial No. 154,438

39 Claims. (Cl. 244—59)

In order to promote the comfort of passengers in airplanes designed to fly at high altitudes, and indeed to avoid harmful physiological effects upon the passengers and crew, due to low pressure at high altitudes, it is necessary to supercharge the cabins of high altitude aircraft. However, there is a point beyond which supercharging cannot be carried practically, for the reason that if an attempt is made to maintain within the cabin an absolute pressure level (for instance if it is attempted to maintain sea level pressures or pressures not lower than some given pressure altitude) at appreciably higher altitudes, there are produced bursting stresses to contain which necessitates very greatly strengthening the cabin and reinforcing it. The added weight makes the aircraft, because of reduction of pay load, economically impracticable. In any attempt to control the pressure within such cabins it must be borne in mind that rate of flow and rate of change of pressure are important considerations as well as the absolute pressure conditions within it, and if rate of flow and rate of change of pressure are properly controlled, pressures appreciably lower than sea level can be borne without noticeable effects, within certain limits, of course.

The present invention relates to the control of pressures within such a cabin in a manner to produce the minimum of deleterious physiological effects; to protect the structure against excessive internal, outwardly directed stresses, or any external inwardly directed stresses, to the end that the total weight and cost of the airplane may be kept to a minimum; to control the rate of flow, both into and from the cabin, and the rate of change of pressure, as necessary; to counteract the effect of leakage from the cabin or of failure of the supercharging system; to provide adequate automatic controls for the inlet and discharge of air, and automatic indicating or operating mechanisms, as a result of the operation of which the system is adjusted to fit conditions present or immediately to be encountered; to lessen the likelihood of failure of the system due to ice formation, to conserve to the greatest degree heat within the cabin when needed; and to provide a system whereby temperature conditions within the cabin will automatically be maintained substantially constant regardless of low external temperatures, particularly noticeable at high altitudes.

More specifically it is an object to provide a system of the character indicated in which internal pressures may be permitted to drop generally in accordance with the pressure altitude curve up to a given altitude, if that be desired; to maintain the internal pressure substantially constant, at a value corresponding to that selected altitude, or to permit only a minor pressure drop from such value, notwithstanding that the aircraft gains in altitude and the external pressure drops materially, until a given pressure differential between the internal and external pressures is reached, and by which the selected pressure differential will thereafter be automatically maintained, as the altitude increases. Thus as the aircraft gains altitude from a landing field the pressure will drop in accordance with the pressure altitude curve of the outside atmosphere, to a selected altitude, then will be maintained nearly constant to a higher altitude, then will be kept at a constant differential above the outside pressure, the absolute pressure dropping continuously but at the same rate as the external pressure drops, until the limit of the capacity of the supercharging system is reached, the system being arranged to give an indication at this point that this limit has been reached.

It is an object to provide in such a system pressure-sensitive elements serving to operate the system automatically, but preferably, though not necessarily, under the control of an attendant, one such pressure-sensitive element being subject to absolute pressures obtaining within the cabin, and the other being subject to differential pressures between the interior of the cabin and the outside atmosphere. It is also an object to provide servo mechanism in association with the elements mentioned, and in such a system, connected to be controlled by the pressure-sensitive elements referred to above, and in turn controlling inlet and outlet flow valves.

It is a further object to provide in such a system inlet and outlet flow valves which will automatically operate to prevent insufficient pressures within the cabin, by admitting outside air should the external atmosphere tend to increase over the internal pressure, or by preventing discharge of air to the exterior should the internal pressure drop unduly. The system is also arranged so that it will automatically prevent discharge of air from the cabin in the event of failure of the supercharging system, and it is further so arranged that the cabin may be sealed off manually should the automatic controls fail to function.

Enough has been said to indicate the general purposes of the invention. It will be better understood as this specification progresses, and further objects will be ascertained in the course of the specific description of the system.

My invention comprises the novel system, and the novel parts thereof, and their relative arrangement, as shown in the accompanying drawings in diagrammatic fashion, and as described in this specification and more particularly defined by the claims at the end of the same.

The accompanying drawings are diagrammatic only, and illustrate a typical system as applied to a passenger airplane intended for high altitude travel.

Figure 1 is a perspective view, showing parts of such an airplane cabin, wing and engine nacelle in shadow view, and illustrating the relationship of the parts of the system to each other, and to the airplane.

Figure 2 is a general sectional view through the principal control elements of such a system, and Figure 3 is a similar view of a control valve, normally manually operable, on an enlarged scale and in a different position from that shown in Figure 2.

Figure 4 is an elevation of the supercharger and heating arrangement and its controls.

Figure 5 is a diagram of the alarm or signal system.

Figure 6 is a graph of the pressure altitude curves, normal and as attained by the use of my invention.

Figure 7 is a section through the control valve, in a position corresponding to Figure 2, but showing a modified form.

The system as a whole is illustrated in Figure 1. A continuously driven supercharger 9, typical of any source of air under pressure, receives air from a convenient source, as from a scoop or ram properly located in a pressure area, as usual, and delivers this air through a conduit 90 and preferably past a heating arrangement, indicated as taking the form of a condenser, radiator, or heat exchanger 91, through a control device generally indicated by the letter M, and thence through a conduit 92, branched as necessary, to the interior of the cabin of the airplane, registers or outlets 93 being provided in the conduit 92 at convenient points. Air is removed from the cabin through registers 94 and a conduit 95 extending preferably through the control device M, and thence by a conduit 96 to a low pressure area externally of the airplane, as for instance upon the upper surface of the wing near its trailing edge. As an alternative or supplementary supply and discharge system I may provide a conduit 97, the forward end or ram of which is located in a pressure area, for instance at the nose of the cabin, to scoop in or admit air, and to discharge it within the interior of the cabin through outlets (not shown), and air may be discharged from the cabin through a conduit 98, which has registers or inlets 99, and which terminates in a low pressure area, for instance at the tail of the fuselage. Provision may be made for connections from one or the other, or from both, of the supply conduits 92, 97, as for example by the branch 97' from the conduit 97, to supply air to individual ventilators (not shown) placed adjacent the passenger seats, and adapted to be opened and closed by the passengers as desired, and as is now customary in passenger airplanes.

It will normally be desired to heat the air, at least that which enters from the supercharger, since the atmosphere at appreciable altitudes is likely to be cold, and it will not be sufficiently warmed in many cases by the compression given it by the supercharger. The details of the heating arrangement constitute a separate invention, and it need only be pointed out here that water is led as needed from a water tank 8 through a boiler 81 disposed within the exhaust stack 80 of an engine (not shown), or is otherwise arranged to be heated, and thus steam may be generated to be supplied to the condenser 91, and the operation of this heating arrangement is under the control of a valve 82 controlled by a thermostat 83 located conveniently, as for instance in the interior of the cabin.

Normally the air for the interior of the cabin at low altitudes will be supplied through the conduit 97, past a valve 7, and the discharge from the conduit 98 will be controlled by a valve 70. These valves are preferably connected for simultaneous operation, that is to say, both may be opened or both may be closed at one time. For instance, the valve 7 is operable by a solenoid 71 and the valve 70 by a solenoid 72, and these solenoids are controlled manually or automatically by or in accordance with pressure-sensitive devices and alarms, which will be later described in detail. It is sufficient to point out here that up to 8000 feet, for instance, the valves 7 and 70 may be left open, and an alarm is given at this pressure altitude as a signal for an attendant to close these valves. There is a further alarm or the same alarm may be used in another circuit, whereby a signal is again given at a considerably greater altitude when the limit of the capacity of the supercharging system is approached.

By reference to Figure 6 it can be seen that the normal pressure altitude curve, shown in dash lines, is one which drops from a point in the vicinity of 30 inches of mercury at sea level to a value in the neighborhood of 12 inches of mercury at 24,000 feet. With the conduits 97 and 98 open at sea level, and from thence up to 8,000 feet (or any similar figure arbitrarily selected), the pressure altitude curve within the cabin will approximately coincide with the external pressure altitude curve, and is shown between points A and B of the graph, Figure 6, in solid lines. The pressure within the cabin may slightly exceed the external pressure for any given altitude because it will be remembered the supercharger is operating continuously, but by a mechanism within the control unit M and to be described hereafter the control unit M, at these altitudes, is arranged to regulate only the rate of flow from the supercharger into the cabin. Between points A and B, the latter approximately 22 inches of mercury, actual supercharging of the cabin is not necessary because normal atmospheric pressures up to 8,000 feet altitude are not physiologically harmful, and, furthermore, it is quite possible that landing fields will be used which are at altitudes up to this figure. Thus between stations A and B the automatic control unit M is so arranged and set that it has no control function except to regulate the rate of flow from the supercharger.

Pressures lower than that obtaining at 8,000 feet commence to become uncomfortable and to produce undesirable, if not harmful, physiological effects, especially on passengers unused to such altitudes, and accordingly it is desired to maintain substantially constant pressure from 8,000 feet upward at least within the capacity of the structure to resist internal pressures greater than those outside. Thus between points B and C on the solid line of Figure 6, that is, from about 8,000 feet to about 16,000 feet, the pressure inside the cabin is maintained substantially constant, though the external pressure is continuously decreasing with increase in altitude. There may be some pressure drop between stations B and C, as indicated at X. It is not large from the physiological standpoint, but is sufficient to effect operation of certain control devices within or associated with the unit M.

At the altitude corresponding to point C, here shown at 16,000 feet, a differential pressure exists between the inside and outside pressures, and this differential is so chosen as to be safely within the structural limits of the cabin, but it is not desired to exceed this differential. Accordingly when a cabin pressure corresponding to the point C has been reached, automatically the control unit M is placed in condition to maintain from this point onward, with further increase of altitude, not a uniform cabin pressure but a uniform differential of pressure between the inside and outside, and thus from point C to D, the latter at, for example, 22,000 feet, the differential pressure is maintained constant, although the absolute pressure within the cabin drops. This differential pressure may be, for instance, 2½ pounds to the square inch. Though no alarm is shown, arranged for operation at point C, and none is needed because the system automatically maintains the differential from point C onward, an alarm might be provided, and the change-over from constant-pressure conditions to constant-differential conditions might be manually accomplished by an attendant attracted by such a signal.

Beyond some given point, as the point D, the cabin pressure differential can no longer be maintained with the capacity of the superchanger selected, although, of course, with a supercharger of different capacity the point D will be differently located. The differential begins to decrease, as is shown by a downwardly trending solid curve from D to E. At point E an absolute cabin pressure is reached, which tends to be physiologically detrimental to the occupants of the aircraft, and at this point it is arranged that a signal shall be given to indicate the attainment of this altitude, and the dropping of internal pressure to this point. This signal indicates to the pilot or attendant that the cabin pressure is too low, and that the aircraft should descend or arrangements should be put into effect immediately to supply emergency oxygen. This signal may be supplanted or supplemented by automatically operable means to initiate such oxygen supply.

The above indicates the aims which are attained by the system which will now be described in detail. Pressures and capacities and altitudes are arbitrarily selected, and may be varied at will, all as will be evident to the aircraft engineer, but those selected will be used for purposes of illustration. Also while I shall proceed to describe the control devices in detail, it will be understood that the arrangement described is chosen purely for purposes of illustration, and that various changes may be made in the form, character, and relative arrangement of the parts without departing from the scope of my invention, as defined in the claims.

The control unit M is shown in Figures 2 and 3. A supercharger supply conduit 90 has in its line a valve 1 which controls the flow from the conduit 90 to the cabin inlet conduit 92, and in the latter is a Venturi throat 10. Movement of the valve 1 is under the control, in part at least, of a piston 11. Outlet from the conduit 95, leading from the interior of the cabin, is past a valve 2, controlling communication between the conduit 95 and the conduit 96, and movement of the valve 2 is under the control, in part at least, of an evacuated Sylphon 21 having an expansion spring 21' within it, the sylphon being exposed to static pressure within the cabin. The conduit 95 has formed within it a venturi 20. Preferably the air in its passage from the conduit 90 to the conduit 92 is led around or adjacent to the cabin outlet to the atmosphere, thereby to warm the latter, due to the heat of the air going to the cabin, and thus to prevent icing conditions which would tend to clog the cabin outlet 96, and if the discharged air should be warmer than the cabin inlet air (which is unlikely), this arrangement tends to absorb any latent heat from the air being discharged, to return it thence to the cabin.

A control valve 3 is provided with two passages 31 and 32 terminating in four ports, adapted, in each operative position of the valve, to register with four of six pipes connected to the valve casing. These pipes are numbered 33, 34, 35, 36, 37 and 38. The two alternative positions of the valve 3 are shown by comparison of Figures 2 and 3. Movement of the valve between the two positions is suitably controlled, manually or automatically, as by the control handle 30. The position of the control valve shown in Figure 2 is that assumed for operation over 8,000 feet, and movement of the valve 1 is under the control of the piston 11 acted upon by outlet flow conditions through the venturi 20, acting, through the pipe 38, the valve passage 31, and the pipe 33, upon the under side of the piston 11. Upon its upper side the piston 11 is acted upon by the cabin static pressure communicated through the pipe 35, the valve passage 32, and the pipe 36, to the upper side of the piston. This piston fits loosely within its cylinder so that air gradually leaks past the piston from its high pressure side to its lower pressure side, tending to equalize such pressures. Movement of the piston in a direction to open the valve is assisted by a coil spring 100. Counterweights 12 prevent heaving or other accelerations of the aircraft in rough air from moving the piston. While the piston 11 is the principal control device for the valve 1, its movement is principally accomplished through servo mechanism comprising a loosely fitting piston 13, the under side of which is connected through a pipe 14 with the atmosphere, its upper side also being in communication with the atmosphere through a pipe 15 past a check valve 16, and its upper side being also in communication through the hollow stem 17 of the valve 1 with the supercharger supply conduit 90, provided the stem 18, movable with the piston 11, does not close the end of the passage through the hollow stem. The valve 1 is manually closable in opposition to any and all automatic controls and forces by a handle 19. This permits closing of the valve 1 to prevent excessive supply of air into the interior of the cabin in such an emergency as would result from the failure of the flow sensitive mechanism to function, or breakage thereof. The operation of this mechanism will be described in detail hereafter.

In the position of the control valve 3 which is shown in Figure 3, which represents the position of the valve below 8,000 feet, the lower side of the control piston 11 is in communication with the cabin inlet flow pressure at the throat of the venturi 10 through the pipe 34, the valve passage 31, and the pipe 33, whereas the upper side of the piston 11 is connected through the pipe 37, the valve passage 32, and the pipe 36 with the inlet at the pressure side of the inlet venturi 10, so as to be under the influence of the cabin inflow, which latter primarily controls the piston 11 at this time.

Like the inlet valve 1, the outlet valve 2 is subject to certain controls, and to a servo device. The evacuated Sylphon 21, which is an absolute pressure-sensitive device, is operable under the control of the differential between two opposed forces, one of which is the spring 21', tending to close the valve 2, and the other of which, a variable, is the cabin static pressure tending to collapse the bellows 21 and thereby to permit opening of the valve 2. Inertia effects from motion of the aircraft are eliminated by counterweights 23. A passage 25 leads from the supercharger static pressure, for instance from the conduit 90, to the under side of the loosely fitting servo piston 24, and to its upper side leads a hollow stem 22 of the valve 2, which hollow stem may be partially or fully closed normally by a stem 27 movable with the Sylphon 21, and a pipe 26 under certain conditions admits external atmospheric pressure to the upper side of the servo piston 24. This communication through the pipe 26 to the atmosphere is accomplished under control of a differential pressure-sensitive bellows 4, having within it a compression-resisting spring 49. This bellows is enclosed within a housing 40, which through a pipe 41 is in communication with the cabin static pressure, so that externally the bellows 4 is under the influence of cabin static pressure tending to compress it, and upon its compression to open the valve 42. Internally the bellows 4 is in communication through a pipe 43 with the outside atmosphere, at a pressure below that of the pressure cabin, and a branch 44 of this pipe communicates past the valve 42 with the pipe 26. When the cabin differential pressure tends to exceed the desired maximum, the bellows and spring yield, allowing the valve 42 to be raised from its seat.

In addition to or in conjunction with the control devices just described, and which are generally indicated in Figure 1 at M, there are control or indicating devices within the cabin and subject to the pressure therein, shown in detail in Figure 5, and in Figure 1 at Y. It has already been noted that the inlet valve 7 and outlet valve 70 in the open or rammed air supply and discharge lines, respectively, are controllable under the influence of the respective doubly wound solenoids 71 and 72. There is provided, as part of the control at Y, a pressure-sensitive Sylphon 5 which is so arranged as to close the gap between terminals 51 in an electric circuit when a pressure altitude within the cabin is reached which corresponds to 8,000 feet, provided that a switch 52 in the circuit is properly closed, that is, is in contact with terminal 57 in the full line position shown in Figure 5. This is the normal position of the switch arm up to 8,000 feet. At 8,000 feet it is desirable to close the valves 7 and 70, and to throw the control device M into operation to maintain constant pressure between the points B and C of the graph Figure 6. Accordingly, upon energization of the signal 54, an attendant throws the switch arm 52 into contact with the terminal 53. This signal or alarm 54, for instance a light, is energized when the pressure-sensitive element 5 closes the gap between the terminals 51, one of which connects with the terminal 57, thereby completing a circuit through the alarm or signal light 54. When the attendant throws the switch 52 into contact with the terminal 53, the solenoids are so energized as to close the valves 7 and 70, and the switch 52 may be so connected that it throws an arm 39, connected to the control valve 3, into such position as to move the control valve 3 into the position of Figure 2. To this end the arms 52 and 39 may be both secured to a common rock shaft, as shown in Figure 5. It may be noted here that in order to open the valves 7 and 70 it is only necessary to throw the switch 52 into contact with the terminal 55, and this motion will turn the control valve 3 into the position of Figure 3.

After the switch handle 52 has been thrown into contact with the terminal 53, and the valves 7 and 70 have been closed, if it is thrown to a neutral position the signal light 54 is no longer illuminated. Such a neutral position may be intermediate the terminals 53 and 57. However, a second pressure device 50, similar to the element 5, is part of the control device Y, within the cabin, the element 50, however, being arranged to close a circuit through the terminals 56 when the pressure altitude reaches 16,000 feet. This is not the actual altitude, the latter being considerably higher, say 24,000 feet, but since the element 50 is within the cabin it is arranged to operate, regardless of the position of the switch arm 52, when the cabin pressure corresponds to the external pressure at 16,000 feet. This again closes a circuit through the signal light 54, indicating that the point E has been reached, and that the pressure has fallen to a point where additional oxygen should be supplied. The element 50 might instead be arranged to close the circuit at the point C, or at the point D on the graph, Figure 6, or there may be several such elements operable at different pressure altitudes. It will be borne in mind that the light 54 is an example of an electrically energizable device which is energizable at selected pressure altitudes by the different pressure-responsive means, and it may as well indicate automatic means to effect movement of valves or control devices, or auxiliary oxygen supply devices, although it is considered preferable to merely signal these conditions to an attendant who may effect proper action.

The operation of the system will be best understood by following through a typical series of actions. As previously noted, from points A to B of the graph cabin supercharging is not occurring, because the valves 7 and 70 are open to equalize internal and external pressures, since normal atmospheric pressures up to 6,000, 7,000 or 8,000 feet are not physiologically harmful or discomforting to passengers. The control valve 3, in the position of Figure 3, controls the rate of flow from the supercharger into the cabin, under the influence of the inlet venturi 10. From point B to point C, where the cabin pressure is maintained substantially constant, the valve 3 is in the position of Figure 2 and the cabin supercharging control device M regulates the rate of flow from the blower into the cabin, under the influence of the outlet venturi 20.

With the control valve in the position of Figure 3 the decrease in pressure effected by the Venturi meter 10 is carried through the valve 3 to act upon the lower side of the piston 11 by evacuating the lower portion of its cylinder faster than air can leak past the loose piston into it from the high pressure side, thus tending to compress the spring 100. The upper side of this piston is subjected to the inlet pressure to the venturi 10 through the pipe 37, communicating to the interior of the conduit 90 but beyond the valve 1. Accordingly any tendency for increase in inlet flow will decrease the pressure on the lower side of the piston 11, and will cause the piston to be deflected downwardly, acting to close the inlet valve 1. A decrease in flow through the venturi 10 will cause the piston 11 to move in the opposite or upward direction under force of the spring 100, opening the valve 1. Therefore constant dynamic flow is provided at the cabin inlet from the supercharger, regardless of the speed of the impeller of the latter. It is to be understood that the actual force required to move the inlet valve is not provided directly by the piston 11, but by the servo piston 13, in the manner previously explained. Thus any tendency for the piston 11 to move downward, due to increase in inlet flow, will open the passage through the hollow valve stem 17, permitting supercharger discharge pressure to pass through this hollow stem to the upper side of the valve 13, where its escape is blocked by the check valve 16, and the increased pressure is resisted only by the normal atmospheric pressure on the under side of the servo piston 13. Accordingly the servo piston 13 will move downwardly in response to downward movement of the piston 11, tending to close the valve 1. Similarly any upward movement of the piston 11 will tend to close the passage through the hollow stem 17, which will have a tendency to decrease the pressure on the upper side of the servo piston 13, by leakage about the piston and escape through 14, or to equalize the pressure above and below it, and the piston 13 will tend to move upwardly under the influence of the inlet impact and pressure acting upon the lower side of the valve 1.

Dependent upon particular weather conditions the inlet valve 7 and outlet valve 70 controlling the open or rammed inlet and discharge, may be either opened or closed. Let us assume that these valves are both open to some degree, according to the requirements of the passengers. When point B is reached the pressure-sensitive element 5 energizes the alarm or signal 54, indicating to the attendant that cabin supercharging should be started. Accordingly the switch handle 52 is moved manually (or automatically, as suggested above) from terminal 57 to terminal 53, to cause closure of the valves 7 and 70, breaking the circuit through the light 54, and as the switch handle approaches the end of such movement its motion is transmitted through the levers 39 and 30 and linkage 39' to the control valve 3, to reverse the latter's position. For control purposes this throws the sensitivity to the flow previously under the influence of the inlet venturi 10, to the outlet venturi 20. The valve is now in the position of Figure 2. Accordingly the cabin inlet valve 1 is regulated in the same fashion as previously described, but under the control of the outlet venturi.

At point B in the graph, which we have now reached, the pressure of the external atmosphere, which is substantially the same as the pressure within the cabin, is no longer sufficient to hold the absolute pressure-sensitive Sylphon 21 collapsed to its limit, for the collapsing force has decreased, while the opposing spring force has remained unchanged, and the Sylphon commences to expand due to pressure from the spring 21' within it. The degree of this expansion is abrupt, and dependent upon the pressure drop X from point B to point C. This pressure drop X is not large from the physiological standpoint, but is sufficient to cause complete expansion of the Sylphon 21, and consequent complete closure of the outlet valve 2. As previously pointed out, the actual force for the movement of the valve 2 is not supplied directly by the stem 27, movable with the Sylphon 21, but by the servo piston 24. The lower side of this piston is subjected continuously through the passage 25 to supercharger static pressure, and the upper side of the servo piston 24 is subjected to atmospheric pressure through the hollow stem 22, but subject to the control of the end of stem 27 which serves to close or tends to close the end of the passage through the hollow stem 22. As long as the stem passage is open the air leaking past the loose piston 24 from its lower, high pressure side will be exhausted to the atmosphere, which will be at a slightly lower pressure. Restriction of such communication will, however, tend to equalize the pressures on both sides of the piston and valve 22 will move toward closed position, resulting in an increase in cabin pressure. Thus starting at point B of the graph, if for any reason the cabin pressure tends to drop, the Sylphon 21 will expand under the influence of spring 21' and will act directly or through the servo mechanism to close the outlet valve 2. Any tendency for the pressure in the cabin to increase from the point B upward will reverse the process, such excess pressure overriding the resistance of the spring 21'.

Occurrence of a leak in the cabin will tend to cause a drop in cabin pressure. The small increment of drop causes a relatively large degree of closure of the cabin outlet valve 2; consequently there is a tendency for the flow to be abruptly reduced through the outlet 96. The consequent reduction of flow in the outlet venturi 20 brings the inlet valve servo mechanism to a new position of equilibrium, providing a greater flow past the inlet valve 1. Accordingly even a very large leak in the cabin will cause a negligible drop in cabin pressure, and an appropriately increased supply of air from the cabin supercharger to resist any drop in the cabin pressure. The supercharger is allowed to overload during the presence of such conditions.

At point C of the graph a cabin supercharging condition is reached such that for structural reasons it is not desirable to further increase the differential pressure between the cabin and the atmosphere. Accordingly the differential pressure responsive element 4 is so arranged that it commences to compress under the differential between the higher cabin static pressure, to which it is subjected exteriorly, and the lesser atmospheric pressure to which it is subjected internally. Compression of the element 4 admits atmospheric pressure past the valve 42 to the upper side of the discharge valve servo piston 24. This causes opening of the discharge valve against the will of the absolute pressure responsive Sylphon 21, in effect overriding the latter, and thus from point C to point D of the graph, and without any action by the attendant, a cabin differential pressure of, for example, 2½ pounds per square inch, is maintained. The rate of flow to the cabin under control of the outlet venturi 20 still remains constant, for as the outlet valve 2 opens, tending to increase the outflow, the inlet valve will tend to open. At point D of the graph the limit of the supply characteristic of the supercharger is reached, and it cannot maintain any longer the desired pressure differential in the cabin, and the cabin inlet valve 1 is then fully open. Beyond point D the 2½ pound cabin pressure differential can no longer be maintained, and the differential tends to decrease. At point E of the graph a cabin pressure is reached which is physiologically detrimental to occupants of the cabin. This, through the pressure-sensitive element 50 or a similar element, causes energization of the alarm or signal 54, and this is the signal to the attendant that the pressure of the cabin is too low, and that either the aircraft should descend or the emergency oxygen supply should be put into use.

It is also the function of the alarm system of Figure 5 to warn the attendant if the supercharging system is not working properly between points C and D. Thus if a leak of very large proportions should have developed in the skin of the aircraft the warning would be given, since the pressure differential would not be maintained. Also any mechanical difficulty in the supercharging or control system resulting in a reduction of cabin pressure below a 16,000 foot pressure altitude would be indicated.

Other conditions in the nature of emergencies may be similarly indicated by the same or other signal devices. For instance, an excessive or insufficient rate of air supply or excessive cabin pressure might be similarly indicated.

During supercharged operation from point B of the graph on through points C and D provision is also made in the control unit for prevention of loss of air from the cabin in the case of complete failure of the supercharger or of the supercharger supply conduit 90. Should any such conditions occur, the inlet valve 1 is returned to its seat by the dynamic effect of reversal of flow at the inlet. The cabin pressure at such a time is in excess of the atmospheric pressure and tends to flow outward past the valve 1 and through the conduit 90, and this tendency to outflow closes the valve 1. Under this condition of reversed flow tendency past the valve 1, outlet valve 2 conditions will be such that the stem 18 will be allowed to close the hole in the stem 17 eliminating differential pressure across the piston 13, again by reason of leakage around and past this piston. The check valve 16 further insures that the pressure above the piston 13 will not be brought to a lesser value than that below the piston 13, which latter condition would tend to cause opening of the valve 1 during reversal of flow past it. The same is true as to the outlet valve 2, since the supercharger pressure through 25 is no longer available to resist its closing. Furthermore, the valve 1 may be forcibly closed by the manual lever 19, in the event of failure of the supercharger or to prevent any excessive cabin pressure resulting from malfunctioning of the control unit.

Both the inlet and outlet valves 1 and 2 are also capable of acting as inlet relief valves. Thus if the aircraft had been operating in the region indicated by point D, and were suddenly brought to a lower altitude it would not be possible for the atmospheric pressure to exceed that of the cabin, for this excessive atmospheric pressure would merely force open the valves 1 and 2, thereby equalizing the pressure within the cabin and that outside it. This would occur even though the supercharger or the pressure-sensitive mechanism in the control unit had become inoperative.

A further modification of the control valve 3 is preferable in some instances, as when the blower or such other cabin air supply device is particularly changeable in discharge pressure or is very unstable. This would be offensive in a comparatively large pressure cabin since, during operation from points B to D in Figure 6 while the average cabin inflow and outflow might be kept very constant, there might still be rather small flow variations of relatively high frequency permitted at the cabin inlet, falling above and below the average inlet flow value.

I prefer, therefore, to temper the flow control in such cases, between points B and D, by allowing the inflow metering system to slightly influence the position of the valve 1, while the predominant influence is still derived from the outflow metering system, and all the herein described beneficial results of a flow sensitivity by an outflow meter are still substantially retained.

One method of tempering is, for instance, produced by slightly trimming off the corners of the valve 3 as indicated at 31' and at 32'. This allows passage 34 to be slightly exposed to passage 33, and passage 37 to be slightly exposed to passage 36 during the position of valve 3 indicated in Figure 7, which corresponds to its position in Figure 2. High frequency flow fluctuations past the valve 1 are thereby prevented during supercharging of the cabin by the damping action of the inlet Venturi control.

It is to be understood that I do not limit myself to the particular forms or devices described in the preceding specification. Thus pressure sensitivity to effect a pressure control with my system might be derived from any equivalent pressure-sensitive device, as a flexible vapor pressure container having a volatile liquid therein at a constant temperature, for instance. Nor are the flow sensitive devices limited to venturis. Hot wire electrical flow meters and various other species of flow meters are recognized equivalents, and are properly adaptable to the control mechanisms described. By the use of the above mentioned volatile liquid as a basis of pressure control, or hot wire flow meter as a flow control, the type of pressure and flow regulations may be made to vary systematically with atmospheric temperature, or cabin temperature. Thus during unusually high atmospheric temperatures at high altitudes which might, together with the temperature rise of air compression, cause uncomfortable cabin temperatures, the flow of air might be reduced to minimize the rate of heat contribution to the cabin and to reduce the cabin temperature. At the lower altitudes, however, the flow may be advantageously increased during hot weather for maximum passenger comfort, because the heat of compression is relatively small at this time and the cabin temperature will be reduced by increased air flow within certain limits.

While I have referred to the passenger cabin as the space or enclosure within which the pressure is regulated, implying by that term the space, usually within the fuselage, occupied by passengers or crew, and while it is to such a cabin that the invention is primarily applicable the term is also to be understood as meaning any enclosed space of an aircraft wherein, for any reason, it is necessary or desirable to maintain given pressure conditions.

What I claim as my invention is:

1. Mechanism to control aircraft cabin pressures, comprising, in combination with means to supply air pressure to the cabin, absolute-pressure responsive means automatically operable to maintain cabin pressures substantially constant, up to a selected differential of cabin pressure above external pressure, and differential-pressure responsive means operable to prevent exceeding such differential for all lower external pressures.

2. Mechanism to control aircraft cabin pressures, comprising, in combination, means to supply air under pressure within the cabin, absolute-pressure responsive means operable to maintain cabin pressures substantially constant, up to a selected differential of cabin pressure above external pressure, and differential-pressure responsive means arranged to override automatically the absolute-pressure responsive means, upon reaching an altitude where a lower external pressure causes such selected differential to be exceeded, said differential-pressure responsive means being operable, so long as such differential tends to be exceeded, to maintain such differential of cabin pressure above external pressure, within the capacity of the pressure source.

3. Mechanism to control aircraft cabin pressures, comprising, in combination with means to supply air under pressure to the cabin, and an outlet to discharge air from the cabin, valve means operable to govern air movement through and pressure within the cabin, means operable primarily under the influence of cabin outflow pressure to operate said valve means to maintain a substantially constant cabin pressure, means operable automatically upon the attainment of a selected differential of cabin pressure above external atmospheric pressure to operate said valve means to maintain such differential during the prevalence of lower external pressures tending to increase the differential.

4. Mechanism to control aircraft cabin pressures, comprising, in combination with a supercharger connected to supply air to the cabin, and an outlet to discharge air from the cabin, a valve controlling inlet from the supercharger, a valve controlling outflow from the cabin, means operable primarily under the influence of inlet flow pressure to differentially operate said valves to maintain a substantially constant rate of flow through the cabin throughout a given altitude range, means operable primarily as a function of cabin outflow pressure to differentially operate said valves to maintain a substantially constant cabin pressure throughout a higher altitude range, and means to selectively render operable one or the other of said latter two means.

5. Mechanism to control aircraft cabin pressures, comprising, in combination with a supercharger connected to supply air to the cabin, and an outlet to discharge air from the cabin, a valve controlling inlet from the supercharger, a valve controlling outflow from the cabin, means operable primarily under the influence of inlet flow pressure to differentially operate said valves to maintain a substantially constant rate of flow through the cabin throughout a given altitude range, means operable primarily as a function of cabin outflow pressure to differentially operate said valves to maintain a substantially constant cabin pressure throughout a higher altitude range, means to selectively render operable one or the other of said latter two means, and means operable under the influence of an attained differential of cabin pressure above external pressure to differentially operate said valves to maintain such differential throughout a still higher altitude range.

6. Mechanism to control aircraft cabin pressures, comprising, in combination with a supercharger connected to supply air within the cabin, and an outlet to discharge air from the cabin, valve means operable to control such supply and discharge, means operable primarily as a function of inlet flow pressure to control such valve means to maintain a constant rate of flow through the cabin throughout a low altitude range, means responsive to a given pressure altitude to signal the attainment of the upper limit of such altitude range, means operable as a result of the operation of the preceding means to alter the manner of control of the valve means, means thereafter operable primarily as a function of cabin outflow pressure to maintain a substantially constant cabin pressure throughout a medium altitude range, means operable in response to a given differential of cabin pressure over external pressure to override the preceding means and to substantially maintain such differential throughout a high altitude range, and signal means responsive to a given pressure altitude to indicate the attainment of a selected minimum cabin pressure.

7. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin.

8. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin, pressure sensitive means governing the operation of said outlet valve, and an absolute pressure sensitive means tending to close said outlet valve with decrease of cabin pressure, thereby tending to maintain constant cabin pressure.

9. Mechanism to control aircraft cabin pressures, comprising, in combination with a supercharger connected to supply air within the cabin, and an outlet to discharge air from the cabin, an inlet valve and an outlet valve separately operable, pressure sensitive means to effect movement of such inlet valve, a control valve operable, in one position, to subject said pressure sensitive means primarily to the influence of inlet flow pressure, thereby to move the inlet valve to effect a substantially constant rate of flow through the cabin, and operable, in another position, to subject said pressure sensitive means primarily to the influence of outlet flow pressure, thereby to move the inlet valve to tend to maintain constant pressure within the cabin, pressure sensitive means governing the operation of said outlet valve, an absolute pressure sensitive means tending to close said outlet valve with decrease of cabin pressure, thereby tending to maintain constant cabin pressure, and a further pressure sensitive device operable as a function of pressure differences between cabin pressure and atmospheric pressure, operatively connected to override the preceding absolute pressure sensitive means, and to effect movement of the outlet valve to maintain a substantially constant selected differential pressure within the cabin.

10. Mechanism to control aircraft cabin pressures, comprising, in combination with means to supply air under pressure within the cabin, and an outlet to discharge air from the cabin, valve means controlling such inflow and outflow, an absolute pressure sensitive device operatively connected to control the valve means, and operable under the influence of a pressure drop within the cabin, through a selected critical range, to restrict the outflow, means operable primarily under the influence of outflow pressure to operate said valve means to maintain a nearly constant pressure, within the region of such critical range, and terminating at the lower limit thereof upon the attainment of a selected differential of cabin pressure over external pressure, and differential pressure sensitive means operatively connected to control said valve means, to permit outflow and to maintain the selected differential pressure automatically at higher altitudes.

11. Mechanism to control aircraft cabin pressures, comprising, in combination with means to supply air under pressure within the cabin, and an outlet to discharge air from the cabin, an inlet valve and an outlet valve arranged to be self-closing upon failure of inflow pressure, and to be self-opening upon subjection to external pressure exceeding the cabin pressure, and means operatively connected to said valves to control them to attain a cabin pressure exceeding the external pressure.

12. Mechanism to control aircraft cabin pressures, comprising, in combination with a supercharger connected to supply air within the cabin, and an outlet to discharge air from the cabin, an inlet valve and an outlet valve arranged to be self-closing upon failure of inflow pressure, and to be self-opening upon subjection to external pressure exceeding the cabin pressure, means operable primarily in accordance with outlet flow pressure to control the inlet valve, whereby upon cessation of outflow the inlet valve will close automatically, and pressure sensitive means to control said outlet valve to attain and maintain cabin pressures in excess of the external pressures.

13. Mechanism to control aircraft cabin pressures, comprising, in combination with a supercharger connected to supply air within the cabin, and an outlet to discharge air from the cabin, an inlet valve and an outlet valve arranged to be self-closing upon failure of inflow pressure, and to be self-opening upon subjection to external pressure exceeding the cabin pressure, means operable primarily in accordance with outlet flow pressure to control the inlet valve, whereby upon cessation of outflow the inlet valve will close automatically, and two pressure sensitive means operatively connected to control said outlet valve, one being sensitive to absolute pressures to maintain a substantially constant cabin pressure throughout a medium altitude range, and at the lower pressure limit of such range closing the outlet valve, and the other being sensitive to the differential of cabin pressure over external pressure then attained, to maintain such differential throughout a higher altitude range.

14. Mechanism to control aircraft cabin pressures, comprising, in combination with an inlet to the cabin from a source of warm air under pressure, and an outlet to discharge air from the cabin, valve means controlling such inlet and outlet, and the inlet being disposed, relative to the outlet, for transference of heat to the outlet, in the vicinity of the valve means, to prevent ice formation.

15. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, and pressure sensitive means to control said outlet valve.

16. Mechanism to control aircraft cabin pressures, comprising, in combination with a supercharger connected to supply air to the cabin, and an outlet to discharge air from the cabin, a flow sensitive device disposed in the supply connection and a second flow sensitive device disposed in the outlet, valve means controlling inflow and outflow, and means selectively operable to control said valve means under the influence of said first flow sensitive means, tending to maintain a constant rate of inflow, or under the influence of the second flow sensitive means, tending to maintain a constant cabin pressure.

17. Mechanism to control aircraft cabin pressures, comprising, in combination with a supercharger connected to supply air to the cabin, and an outlet to discharge air from the cabin, a flow sensitive device disposed in the supply connection and a second flow sensitive device disposed in the outlet, valve means controlling inflow and outflow, means selectively operable to control said valve means under the influence of said first flow sensitive means, tending to maintain a constant rate of inflow, or under the influence of the second flow sensitive means, tending to maintain a constant cabin pressure, and pressure sensitive means operable under the influence of an attained differential of cabin pressure over atmospheric pressure, and further operable, upon the attainment of such differential, to control said valve means, tending to maintain such differential.

18. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, a control piston and a servo piston operatively connected to the inlet valve, a control valve having two passages and movable between two positions, its casing having two ports connected above and below the control piston, respectively, with which the passages connect in either position, and having four additional ports, with two of which the passages connect in one position, and connecting respectively to the inlet venturi flow pressure and to the supercharger static pressure, and with the other two of which the passages connect in the other position and connecting respectively to the outlet venturi flow pressure and to the interior of the cabin, whereby, in the first position the control piston and the inlet valve are operable under control of inflow to maintain a constant rate of flow, and in the second position are operable under control of outflow to tend to maintain a selected cabin pressure, and pressure sensitive means to control said outlet valve, operable upon the attainment of a given pressure altitude to tend to maintain the same.

19. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, a pressure sensitive element and a servo piston operatively connected to control said outlet valve, a conduit leading supercharger static pressure to one side of said servo piston, tending to move it in a direction to open said outlet valve, a hollow stem movable with the valve and piston, and adapted to connect its opposite side to the atmosphere, whereby to control said valve as a function of the differential between atmospheric and supercharger pressures, the pressure sensitive element being subjected to cabin static pressure tending to collapse it in a direction to permit opening of the valve, and a stem movable in response to movement of the pressure sensitive element, disposed to close the hollow stem as the servo piston and valve move towards open position, and to effect closing of the valve as the pressure sensitive element expands, thereby tending to maintain a constant pressure within the cabin.

20. Mechanism to control aircraft cabin pressures, comprising, in combination with a supercharger connected to supply air to the cabin, and an outlet to discharge air from the cabin, a venturi interposed between the supercharger and the cabin, an inlet valve between the supercharger and said venturi, a second venturi between the cabin and the outlet, an outlet valve between the latter venturi and the outlet, means operatively connected to the inlet valve to move the same in accordance with a flow pressure through one or the other of said venturis, means selectively operable to connect at will the inlet venturi or the outlet venturi for control of said inlet valve, a pressure sensitive element and a servo piston operatively connected to control said outlet valve, a conduit leading supercharger static pressure to one side of said servo piston, tending to move it in a direction to open said outlet valve, a hollow stem movable with the valve and piston, and adapted to connect its opposite side to the atmosphere, whereby to control said valve as a function of the differential between atmospheric and supercharger pressures, the pressure sensitive element being subjected to cabin static pressure tending to collapse it in a direction to permit opening of the valve, a stem movable in response to movement of the pressure sensitive element, disposed to close the hollow stem as the servo piston and valve move towards open position, and to effect closing of the valve as the pressure sensitive element expands, thereby tending to maintain a constant pressure within the cabin, a conduit connecting to the atmosphere and leading to the side of the servo piston opposite that which is subjected to the supercharger pressure, a normally closed valve in such conduit, and an element movable in accordance with an attained differential between cabin pressure and atmospheric pressure to open the latter valve, thereby to subject the servo piston to a lowered atmospheric pressure and to move it, in opposition to the first pressure sensitive element, to open the outlet valve under the influence of such differential pressure, and to tend to maintain such differential.

21. The method of controlling aircraft cabin pressures which comprises maintaining a substantially constant cabin pressure, by regulating inflow and outflow under the influence primarily of outflow pressure, through a selected medium altitude range, until a selected differential of cabin pressure over external pressure is attained, and then at higher altitudes maintaining such differential by regulating inflow and outflow under the influence of a differential pressure sensitive device overriding the outflow pressure regulating device.

22. The method of regulating inflow to and outflow from an aircraft cabin which comprises maintaining a substantially constant rate of inflow in accordance with inflow pressure, up to a selected altitude, from such altitude to a higher altitude maintaining a substantially constant attained pressure by regulating inflow and outflow primarily in accordance with outflow pressure, until a selected differential of cabin pressure over external pressure is attained, and at higher altitudes maintaining such differential primarily in accordance with such attained differential.

23. In an aircraft, in combination, sustaining wings, a power plant and propellers to sustain flight at high altitudes, a cabin supported by the wings, the structure of said cabin including walls defining an airtight compartment, said walls being of desired but limited structural strength, an air supply conduit admitting to the interior of said compartment, and a port to discharge air therefrom, a pressure source to deliver air under pressure to the cabin through said air supply conduit, inlet valve means interposed between said pressure source and the cabin, outlet valve means controlling discharge from the cabin, absolute pressure responsive means automatically operable to control said valves to maintain cabin pressure substantially constant, up to a selected differential of cabin pressure above external pressure, at which differential the limit of strength of the cabin structure, within a selected safety factor, is approached, and differential-pressure responsive means operable to maintain such differential, within the safety factor, for a lower external pressure, within the capacity of the pressure source.

24. Mechanism to control aircraft cabin pressures, comprising, in combination with means to supply air under pressure within the cabin, differential-pressure responsive means always operable to prevent the cabin pressure exceeding a selected pressure above the external pressure, and means to increase the cabin pressure to a value above the external pressure, within the limiting differential fixed by said differential-pressure responsive means.

25. Mechanism to control aircraft cabin pressures, comprising, in combination with means to supply air under pressure within the cabin, differential-pressure responsive means operable to prevent the cabin pressure exceeding a selected pressure above the external pressure, and means automatically operable at a selected altitude to initiate increase of the cabin pressure to a value above the external pressure, within the limiting differential fixed by said differential-pressure responsive means.

26. Mechanism to control aircraft cabin pressures, comprising, in combination with means to supply air under pressure to the cabin, differential-pressure responsive means operable to prevent the cabin pressure exceeding a selected pressure differential above the external pressure, and means automatically operable at a predetermined altitude to initiate a change of cabin pressure relative to external pressure, at a predetermined rate as related to altitude, within the lower limit fixed by the external pressure and the upper limit fixed by said differential-pressure responsive means.

27. In combination with an aircraft pressure cabin structure having a known resistance to bursting under the influence of a higher pressure internally than externally, means to supply air under pressure within the cabin, absolute-pressure means operable to create such a pressure difference, and differential-pressure means arranged always and automatically to overrule said absolute-pressure means and to limit the pressure difference to a safe value within the bursting strength of the cabin structure.

28. Mechanism to control aircraft cabin pressures, comprising, in combination with means to supply air under pressure to the cabin, absolute-pressure responsive means automatically operable to maintain cabin pressures substantially constant, and differential-pressure responsive means automatically operable to prevent cabin pressures from exceeding any selected differential above external pressure.

29. Mechanism to control aricraft cabin pressures, comprising, in combination with means to supply air under pressure within the cabin, differential-pressure responsive means automatically operable to prevent cabin pressures from exceeding any selected differential above external pressure, and means to maintain at all times a substantially constant rate of airflow through the cabin.

30. Mechanism to control aircraft cabin pressures, comprising, in combination with means to supply air under pressure at a substantially constant rate within the cabin, means operable automatically in accordance with a change in the relationship of external pressure to internal pressure to prevent the internal pressure from exceeding, by more than a selected amount, the external pressure.

31. Mechanism to control aircraft cabin pressures, comprising, in combination with means to supply air under pressure to the cabin, and an outlet to discharge air from the cabin, valve means operable to govern air movement through and pressure within the cabin, means to operate said valve means to maintain a substantially constant cabin pressure, means operable automatically upon the attainment of a selected differential of cabin pressure above external atmospheric pressure to operate said valve means to maintain such differential during the prevalence of lower external pressures tending to increase the differential.

32. Mechanism to control aircraft cabin pressures, comprising in combination with means to supply air under pressure to the cabin, differential-pressure responsive means operable to prevent exceeding a given cabin pressure differential over external pressures, and absolute-pressure responsive means automatically operable, inside such differential, to maintain cabin pressures substantially constant.

33. Mechanism to control aircraft cabin pressures, comprising, in combination with means to supply air under pressure to the cabin, absolute-pressure responsive means operable to maintain cabin pressures substantially constant, up to a selected differential of cabin pressure above external pressure, differential-pressure responsive means operable to prevent exceeding such differential for all lower external pressures, and means operable to maintain at all times a substantially constant rate of air flow through the cabin.

34. Mechanism to control aircraft cabin pressures, comprising, in combination with means to supply air under pressure to the cabin, absolute-pressure responsive means operable to maintain cabin pressure substantially constant, up to a selected differential of cabin pressure above external pressure, and differential-pressure responsive means operable, independently of the absolute-pressure responsive means, to prevent exceeding such differential for all lower external pressures.

35. Mechanism to control aircraft cabin pressures, comprising, in combination with means to supply air under pressure to the cabin, two pressure responsive means, one whereof is sensitive to the pressure differential of cabin pressure over external pressure, and always operable to prevent such differential exceeding a selected value, and the second operable to regulate cabin pressure within the differential thus determined.

36. The method of controlling aircraft cabin pressures which comprises regulating supply of air to and its discharge from the cabin under the influence of the differential of cabin pressure over external pressure, to prevent such differential exceeding a selected value, and regulating the cabin pressure to attain a selected cabin pressure which is not in excess of the selected differential value.

37. Mechanism for controlling the pressure within an aricraft cabin, comprising pressure responsive means operable automatically to establish a pressure differential between the pressure within the cabin and the exterior atmospheric pressure, and means responsive to cabin interior pressure operable to vary the pressure to which said first means is subjected.

38. Mechanism for controlling the pressure within an aircraft cabin, comprising a valve for controlling the flow of air through such cabin, operating means for said valve actuated by communication with external atmospheric pressure, and means operable to regulate such communication of said operating means with the external atmospheric pressure to govern the cabin pressure, influenced by flow past said valve.

39. Mechanism for controlling the pressure within an aircraft cabin, comprising a valve for controlling the flow of air through such cabin, operating means for said valve actuated by communication with external atmospheric pressure, and means responsive to cabin interior pressure operable to regulate such communication of said operating means with the external atmospheric pressure to govern the cabin pressure, influenced by flow past said valve.

NATHAN C. PRICE.

CERTIFICATE OF CORRECTION.

Patent No. 2,208,554.  July 16, 1940.

NATHAN C. PRICE.

It is hereby certified that error appears in the printed specification of the above numbered patent requiring correction as follows: Page 1, second column, line 14-15, for "superchanging" read --supercharging--; page 2, first column, line 51, for "92, 97" read --92 or 97--; page 3, first column, line 24, for "superchanger" read --supercharger--; page 6, second column, line 63, claim 1, for "air pressure" read --air under pressure--; page 10, second column, line 48, claim 37, for "aricraft" read --aircraft--; and that the said Letters Patent should be read with this correction therein that the same may conform to the record of the case in the Patent Office.

Signed and sealed this 8th day of October, A. D. 1940.

Henry Van Arsdale,
Acting Commissioner of Patents.

(Seal)